United States Patent
Lin et al.

(10) Patent No.: US 10,057,097 B2
(45) Date of Patent: Aug. 21, 2018

(54) MODULATION METHOD AND DEVICE DELIVERING A MULTICARRIER SIGNAL, AND CORRESPONDING DEMODULATION METHOD AND DEVICE AND COMPUTER PROGRAM

(71) Applicant: Orange, Paris (FR)

(72) Inventors: Hao Lin, Cesson-Sevigne (FR); Pierre Siohan, Rennes (FR)

(73) Assignee: ORANGE, Paris (FR)

( * ) Notice: Subject to any disclaimer, the term of this patent is extended or adjusted under 35 U.S.C. 154(b) by 17 days.

(21) Appl. No.: 14/894,877

(22) PCT Filed: May 28, 2014

(86) PCT No.: PCT/FR2014/051275
§ 371 (c)(1),
(2) Date: Nov. 30, 2015

(87) PCT Pub. No.: WO2014/191693
PCT Pub. Date: Dec. 4, 2014

(65) Prior Publication Data
US 2016/0112229 A1    Apr. 21, 2016

(30) Foreign Application Priority Data
May 28, 2013    (FR) ..................... 13 54842

(51) Int. Cl.
*H04L 27/26*    (2006.01)
(52) U.S. Cl.
CPC ...... *H04L 27/2602* (2013.01); *H04L 27/2627* (2013.01); *H04L 27/2631* (2013.01); *H04L 27/2698* (2013.01)

(58) Field of Classification Search
CPC ......... H04L 25/03834; H04L 25/03343; H04L 25/068; H04L 27/2631; H04L 27/2698; H04L 27/264
See application file for complete search history.

(56) References Cited

U.S. PATENT DOCUMENTS 7,609,611 B1 * 10/2009 Siohan .................. H04J 4/005
                                                     370/208
9,166,858 B2    10/2015 Dandach et al.
(Continued)

FOREIGN PATENT DOCUMENTS

FR        2972091 A1    2/2011

OTHER PUBLICATIONS

Deepak Dasalukunte, Fredrik Rusek, John B. Anderson and Viktor Owall, "Transmitter Architecture for Faster-than-Nyquist Signaling Systems", Lund University, Sweden, IEEE, 2009.*
(Continued)

*Primary Examiner* — Aristocratis Fotakis
(74) *Attorney, Agent, or Firm* — David D. Brush; Westman, Champlin & Koehler, P.A.

(57) ABSTRACT

A method is provided for modulating data symbols, outputting a multi-carrier signal, implementing: a mathematical transform, which transforms data symbols from the frequency domain to a time domain, outputting transformed symbols; and a polyphase filtering, which filters the transformed symbols, outputting the multi-carrier signal. The polyphase filtering uses an expansion factor taking account of a compression factor $\tau$, the compression factor $\tau$ being a number between 0 and 1 such that the multi-carrier signal can be transmitted at a Faster-Than-Nyquist rate.

10 Claims, 5 Drawing Sheets

(56) References Cited

U.S. PATENT DOCUMENTS

| | | | | |
|---|---|---|---|---|
| 2008/0260061 A1* | 10/2008 | Javaudin | ............ | H04L 27/2082 375/261 |
| 2011/0188550 A1* | 8/2011 | Wajcer | ............ | H04L 25/03343 375/214 |
| 2012/0243625 A1* | 9/2012 | Berg | ............ | H04L 25/022 375/260 |
| 2015/0110219 A1* | 4/2015 | Lim | ............ | H04K 1/00 375/295 |
| 2015/0139356 A1* | 5/2015 | Song | ............ | H04L 27/264 375/296 |
| 2015/0351098 A1* | 12/2015 | Schellmann | ............ | H04L 5/0064 370/329 |

OTHER PUBLICATIONS

Pierre Siohan, Cyrille Siclet, and Nicolas Lacaille, "Analysis and Design of OFDM/OQAM Systems Based on Filterbank Theory", France Télécom, IEEE, May 2002.*

Deepak Dasalukunte, Multicarrier Faster-than-Nyquist Signaling Transceivers, Lund University, Ph.D Thesis, Jan. 2012.*

Youssef Dandach and Pierre Siohan, "FBMC/OQAM modulators with half complexity", Orange Labs, IEEE, 2011.*

Deepak Dasalukunte, Fredrik Rusek, and Viktor Öwall, "Multicarrier Faster-Than-Nyquist Transceivers: Hardware Architecture and Performance Analysis", Lund University, Sweden, IEEE, 2009.*

J. E. Mazo, "Faster-than-Nyquist Signaling"—American Telephone and Telegraph Company, The Bell System Technical Journal vol. 54, No. 8, Oct. 1975.

D. Dasalukunte et al., "An Iterative Decoder for Multicarrier Faster-than-Nyquist Signaling Systems"—Department of Electrical and Information Technology and Center for High Speed Wireless Communication, Lund University, Lund, Sweden 221 00., IEEE ICC 2010 proceedings.

International Search Report and Written Opinion dated Sep. 19, 2014 for corresponding International Patent Application No. PCT/FR2014/051275.

English translation of the International Search Report, dated Dec. 4, 2014, and Written Opinion, dated Nov. 28, 2015, for corresponding International Patent Application No. PCT/FR2014/051275.

Deepak Dasalukunte et al: "Multicarrier Faster-Than-Nyquist Transceivers: Hardware Architecture and Performance Analysis", IEEE Transactions on Circuits and Systems I: Regular Papers, IEEE, US, vol. 58, No. 4, Apr. 1, 2011 (Apr. 1, 2011), pp. 827-838, XP011352197.

Prendergast R. S. et al: "Optimal Filter Bank Reconstruction of Periodically Undersampled Signals", 2005 IEEE International Conference on Acoustics, Speech, and Signal Processing—Mar. 18-23, 2005—Philadelphia, PA, USA, IEEE, Piscataway, NJ, vol. 4, Mar. 18, 2005 (Mar. 18, 2005), pp. 201-204, XP010792517.

* cited by examiner

MODULATION METHOD AND DEVICE DELIVERING A MULTICARRIER SIGNAL, AND CORRESPONDING DEMODULATION METHOD AND DEVICE AND COMPUTER PROGRAM

1. CROSS-REFERENCE TO RELATED APPLICATIONS

This application is a Section 371 National Stage Application of International Application No. PCT/FR2014/051275, filed May 28, 2014, the content of which is incorporated herein by reference in its entirety, and published as WO 2014/191693 A1 on Dec. 4, 2014, not in English.

2. DOMAIN OF THE INVENTION

The domain of the invention is communications involving a multi-carrier modulation.

More precisely, the invention discloses a modulation technique for an FTN (Faster-Than-Nyquist) data transmission for multi-carrier systems.

The invention is particularly useful in applications in the field of wireless communications (DAB, DVB-T, WLAN, unguided optical, etc.) or wire communications (xDSL, PLC, optical, etc.). For example, the invention is used in applications in the field of cell communications, on uplink and downlink channels, Device to Device communications (D2D), communications from a backhauling network, etc.

3. PRIOR ART

The principle of Faster-Than-Nyquist transmissions was disclosed by E. Mazo in 1975, in the "Faster-than-Nyquist signaling" document (Bell. Syst. Tech. Journal, 54:1451-1462).

According to this document, transmission at Nyquist rate can be illustrated by considering the transmission of a sequence of independent binary data $\{\alpha_n\}$ such as $\alpha_n=\pm 1$ by a Nyquist pulse:

$$g(t) = \frac{\sin(\pi t/T)}{(\pi t/T)}$$

This transmission can be made without interference, and therefore without error, in a transmission channel with width W, where T is the duration of a symbol such that T=½W. In the case of a transmission disturbed by AWGN (Additive White Gaussian Noise), the optimum detector that will minimize the probability of bit errors is made using a reception filter adapted to the Nyquist pulse, i.e. g(−t).

This transmission system is orthogonal, in other words it satisfies the following condition:

$$\int g(t-nT)g(t-n'T)dt = \delta_{n,n'}$$

where $\delta$ denotes the Kronecker symbol.

To go Faster-Than-Nyquist (FTN) without changing the transmission power, pulses can be brought closer to each other by transmitting them at a spacing with a duration T'<T, in other words by compressing them by a factor $\rho$ such that T'=$\rho$T where 0<$\rho$<1. It is then verified that WT'<½ instead of WT=½.

Therefore, such an FTN transmission can reduce the transmission time for a given data volume, or in other words increase the information volume for a given transmission time.

However, FTN transmission generates strong interference, and specific signal processing processes are necessary to cancel this interference.

Furthermore, it was essentially developed for mono-carrier modulations.

D. Dasalukunte et al. disclosed an FTN transmission technique adapted to a multi-carrier system in the « Multi-carrier faster than Nyquist transceivers: Hardware architecture and performance analysis» document (IEEE Transactions on Circuits and Systems I: Regular Papers, 58, 2011).

The technique described in this document concerns OFDM/OQAM modulations, and introduces time and frequency compression factors $T_A$ and $F_A$ respectively, such that $T_A F_A < 1$. In other words, the time-frequency network for the transmission of data symbols with a real value thus becomes $(T_A T/2, F_A/T)$, i.e. the duration between two multi-carrier symbols is $T_A T/2$ and the space between two carriers is $F_A/T$, where T is the duration of a multi-carrier symbol.

In order to make an FTN type multi-carrier transmission, this document discloses the introduction of a special processing block, called the «FTN mapper» (projection shape using a Gaussian function).

One disadvantage of this technique is that gains made on the Nyquist rate are significantly less than theoretical gains. In the document mentioned above, the special processing block performs processing by blocks of time-frequency data for each sub-carrier. These blocks with size $N_t \times N_f$ are preferably chosen such that $N_t = N_f = 3$, to give a compromise between complexity and performance. In order to switch from a multi-carrier FTN type time-frequency network compressed in time by a compression factor $T_A$ to the usual OFDM/OQAM network, edge effects are such that neither all M carriers nor all K time interval symbols can be taken into account. The problem of aliasing reduces for very high values of M and K but it is very penalizing for usual values used.

Thus for values of parameters $N_t = N_f = 3$, M=128 and K=16, if the compression factor $T_A$ is equal to 0.9, theoretically an increase of the order of 11% in the rate is achieved, although there is actually a loss of 8%. If K=10, this improves the flexibility of the system but it further reduces the effective compression factor which becomes 0.78 instead of 1.11.

Another disadvantage of this technique is that the special processing block introduces an operational complexity proportional to the number of carriers M and to its size ($N_t, N_f$). Thus, the number of multiplications by the Gaussian function used for the "FTN mapper" block is of the order of $\sigma(N_t N_f M)$.

Therefore the technique described in the "Multicarrier faster than Nyquist transceivers: Hardware architecture and performance analysis" document is complex, not very realistic in terms of implementation of the system, and introduces a transmission delay because data symbols have to be projected or "mapped" before they can be transmitted.

Therefore, there is a need for a new FTN transmission technique adapted to a multi-carrier system without all the disadvantages of prior art.

4. SUMMARY

The invention discloses a new solution that does not have all these disadvantages of prior art, in the form of a method for modulation of data symbols, outputting a multi-carrier signal implementing:

a mathematical transform step for transforming data symbols from the frequency domain to a time domain, outputting transformed symbols;

a polyphase filtering step for filtering transformed symbols, outputting the multi-carrier signal.

According to the invention, the polyphase filtering step uses an expansion factor using a compression factor $\tau$, the compression factor $\tau$ being a number between 0 and 1 capable of transmitting the multiple-carrier signal at a Faster-Than-Nyquist rate.

The invention thus discloses a new solution for the Faster-Than-Nyquist (FTN) transmission of a multi-carrier signal. The transmission time for a given volume of data can then be reduced.

Furthermore, the FTN transmission in the form of a frequency multiplex provides a means of benefiting from the advantages of multi-carrier systems, such as flexibility of the modulator (for example the possibility of cutting off some carriers) or the use of efficient algorithms for implementation of the modem (for example based on Inverse Fast Fourier Transforms (IFFT) or Fast Fourier Transform (FFT)).

The disclosed solution thus provides a new modulation technique for increasing the transmission speed in a given frequency band. In particular, it is used in applications in cell communications, mainly for the uplink channel for which relatively complex equalization techniques can be envisaged at the base station, but also for the downlink channel, for example if the receiver is a tablet type receiver. Applications are more generally in any domain requiring high speed data transmission.

In particular, the invention can be applied to multi-carrier modulation systems that initially satisfy either the complex orthogonality condition (as for OFDM), or the real orthogonality condition (as for OFDM/OQAM). Therefore data symbols may be real values or complex values.

Furthermore, the invention makes it possible to approach the target compression factor. In other words, there is little difference between the theoretical compression factor and the real compression factor.

The disclosed solution is more flexible than the technique disclosed in the document entitled « Multicarrier faster than Nyquist transceivers: Hardware architecture and performance analysis», and is not limited by a block size (for example K symbols per time interval). Furthermore, the technique disclosed in this document requires the use of two function systems, one for special processing (FTN mapper) and the other for modulation, while a single function system is required in the disclosed solution, as in standard OFDM/OQAM schemes, which can reduce the implementation complexity.

According to one particular characteristic of the invention, the expansion factor is equal to the integer rounding of $$\left[\tau \cdot \frac{M}{2}\right]$$

if the data symbols nave real values, as for an OFDM/OQAM type modulation, and the expansion factor is equal to the integer rounding of $[\tau \cdot M]$ if the data symbols have complex values, as for an OFDM/QAM or oversampled OFDM type modulation, where M is an integer equal to the size of the mathematical transform.

The use of such an expansion factor denoted $N_f$, also called the FTN factor, takes account of the compression factor $\tau$ during the polyphase filtering phase in which the carriers are shaped (to obtain real or complex orthogonality of the carriers if $\tau=1$), and therefore contributes to transmission of data at higher speed than techniques in prior art.

According to a particular embodiment, the modulation method according to the invention comprises a data symbol pre-processing step, applied before the mathematical transform step. Such a preprocessing step of data symbols implements multiplication of data symbols by a term taking account of the compression factor $\tau$.

This pre-processing step is used particularly if the length of the prototype filter is even. On the other hand, it is optional if the length of the prototype filter is odd.

It takes account of the compression factor $\tau$ during the pre-processing phase, and thus contributes to high speed data transmission.

According to one particular aspect of the invention, the modulation method comprises a transformed symbols post-processing step, implemented before the filtering step. In particular, this post-processing step enables to repeat transformed symbols.

In particular, when the mathematical transform step outputs M transformed symbols where M is an integer, the post-processing step implements repetition by block of the M transformed symbols, outputting $b_1$ blocks of M transformed symbols, implements, where $b_1$ is an integer such that $b_1>0$, and a sub-block of $b_2$ transformed symbols, where $b_2$ is an integer such that $0 \leq b_2 < M$, and the polyphase filtering step uses a prototype filter with size $L=b_1M+b_2$ that uses $b_1$ blocks of M transformed symbols and the sub-block of $b_2$ transformed symbols as inputs.

Such a post-processing step can thus make it possible to use any prototype filter, by adapting the number of transformed symbols to the size of the prototype filter.

Therefore it provides very good flexibility to the modulation scheme.

For example, $b_1$ is equal to 4 and $b_2$ is equal to 0. Therefore, the block of M transformed symbols output from the mathematical transform step is "copied" four times.

According to another particular embodiment, for an OFDM/OQAM type modulation and for data symbols with real values, the mathematical transform step uses a transformation from the frequency domain to the time domain comprising the following sub-steps:

application of a partial inverse Fourier transform to data symbols, outputting a first sub-set of C transformed symbols;

from the first sub-set, obtain a second sub-set of (M-C) transformed symbols, the second sub-set of transformed symbols being complementary to the first sub-set of transformed symbols, to form the set of M transformed symbols.

In particular, if the length of the prototype filter $L=b_1M+b_2$ is more than M, the mathematical transform step also implements a sub-step for repetition and permutation of the M transformed symbols, outputting L transformed symbols, where L, M and C are integers such that $L>M>C$.

Thus, some of the "conventional" outputs from a frequency/time transform module are calculated using a partial Fourier Transform type algorithm, and the other outputs are deduced from the first calculated outputs.

This considerably reduces the number of operations (multiplications, additions) made conventionally.

According to one particular characteristic of the invention, the compression factor $\tau$ is strictly less than 1. Consequently, the rate of the multi-carrier signal output from the polyphase filtering step is Faster-Than-Nyquist.

According to another aspect of the invention, the modulation method comprises a step to update the expansion factor, following an update to the compression factor τ. For example, the compression factor τ may be adapted depending on the quality of the transmission channel. A feedback channel may then be provided to give information about the transmission channel to the modulator.

In particular, data symbols for an OFDM/OQAM type modulation have real values, and data symbols for an OFDM type modulation have complex values.

According to another embodiment, the invention relates to a data symbol modulation device, outputting a multi-carrier signal, comprising:
- a mathematical transform module for transforming data symbols from the frequency domain to a transformed domain, outputting transformed symbols;
- a polyphase filtering module for filtering the transformed symbols, outputting the multi-carrier signal.

According to the invention, such a polyphase filtering module uses an expansion factor taking account of a compression factor τ, the compression factor τ being a number between 0 and 1 so that the multi-carrier signal can be transmitted at a Faster-Than-Nyquist rate.

Such a modulation device is particularly adapted to implement the modulation method described above. For example, it may be a base station in a cell network for downlink communication, or a computer, telephone, tablet, set-top box type terminal, etc, for uplink communication. Obviously, this device could include the different characteristics related to the modulation method according to the invention, that can be combined or considered alone. Thus, the characteristics and advantages of this device are the same as those in the method described above. Consequently, they will not be described in more detail.

In particular, such a modulation device also called a modulator, provides good precision for the multi-carrier signal, of the order of that obtained by direct implementation of equations for the multi-carrier signal.

Furthermore, the disclosed solution can be used to perform an OFDM/OQAM modulation using a scheme different from prior art, that in particular takes account of data symbols with complex values.

The invention also relates to a method of demodulating a multi-carrier signal, outputting estimated data symbols, implementing:
- a polyphase filtering step for filtering said multi-carrier signal, outputting data symbols in the time domain;
- a mathematical transform step for transforming data symbols in the time domain, from a transformed domain to the frequency domain, outputting data symbols in the frequency domain;

According to the invention, the polyphase filtering step uses a decimation factor taking account of a compression factor τ, the compression factor τ being a number between entre 0 and 1 for transmitting the multi-carrier signal at a Faster-Than-Nyquist rate.

Such a demodulation method is particularly suitable for demodulating a multi-carrier signal modulated using the modulation method described above. In particular, such a method can be used to demodulate a multi-carrier signal received at a Faster-Than-Nyquist rate.

The characteristics and advantages of this demodulation method are the same as those of the modulation method. Consequently, they will not be described in more detail.

According to one particular embodiment of the invention, the decimation factor is equal to the integer rounding of $$\left[\tau \cdot \frac{M}{2}\right]$$

if the data symbols before modulation are real values, as for an

OFDM/OQAM type demodulation, and the decimation factor is equal to the integer rounding of [τ · M] if the data symbols before modulation are complex values, as for an OFDM/QAM type demodulation or an oversampled OFDM demodulation, where M is an integer equal to the size of the mathematical transform.

The use of such a decimation factor denoted $N_{ft}$ also denoted the FTN factor, takes account of the compression factor τ during the polyphase filtering phase, and therefore contributes to reception of data at a higher speed than techniques according to prior art.

In particular, the demodulation method comprises an optional step for post-processing of data symbols in the frequency domain, outputting estimated data symbols. The post-processing step implements multiplication of data symbols in the frequency domain by a term taking account of the compression factor τ.

This post-processing step is used particularly if the length of the prototype filter is even. On the other hand, it is optional if the length of the prototype filter is odd.

In another embodiment, the invention relates to a device for demodulating a multi-carrier signal, outputting estimated data symbols, comprising:
- a polyphase filtering module for filtering said multi-carrier signal, outputting data symbols in the transformed domain,
- a mathematical transform module for transforming said data symbols in the transformed domain, from a transformed domain to the frequency domain, outputting data symbols in the frequency domain.

According to the invention, the polyphase filtering module uses a decimation factor taking account of a compression factor τ, the compression factor τ being a number between 0 and 1 so that the multi-carrier signal can be transmitted at a Faster-Than-Nyquist rate.

Such a demodulation device is particularly suitable for applying the demodulation method described above. For example it may be a base station in a cell network for an uplink communication, or a computer, telephone, tablet, set-top box type terminal, etc, for a downlink communication. Obviously, this device could have different characteristics related to the demodulation method according to the invention, that may be combined or taken alone. Thus, the characteristics and advantages of this device are the same as those for the method described above. Consequently, they will not be described in more detail.

The invention also relates to one or several computer programs, including instructions for the use of a modulation method like that described above, when this or these programs are run using a processor, and one or several computer programs including instructions for the use of a demodulation method like that described above when this or these programs are run using a processor.

Therefore the method according to the invention can be used in various manners, particularly in wired form or in software form.

The invention also relates to an information medium that can be read using a computer, comprising the instructions of a computer program like that mentioned above.

4. LIST OF FIGURES

Other characteristics and advantages of the invention will become clearer after reading the following description of a particular embodiment, given as a simple illustrative example that is not in any way imitative and the appended drawings, on which.

5. DESCRIPTION OF ONE EMBODIMENT OF THE INVENTION

5.1 General Principle

The general principle of the invention is based on the use of a compression factor at an expander/decimator of a polyphase filter of a multi-carrier modulator/demodulator for Faster than Nyquist data transmission. Remember that for a theoretical compression factor $\tau$ equal to between 0 and 1, it is expected that the throughput will be multiplied by a factor of $1/\tau$ from the so-called Nyquist rate.

Figure 1:
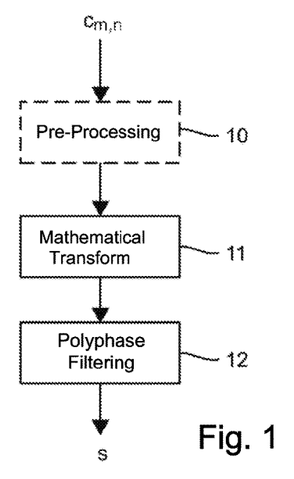
FIG. 1 shows the main steps used by the modulation method according to a particular embodiment of the invention.

More precisely, FIG. 1 shows the main steps involved in a modulation method according to one embodiment of the invention.

Such a method receives data symbols as input, that may have real values denoted $a_{m,n}$, or complex values, denoted $c_{m,n}$.

These data symbols undergo a mathematical transform 11 from the frequency domain to a transformed domain outputting transformed symbols. This step can use a conventional transform for example of the inverse Fast Fourier Transform type, or if data symbols have real values, a partial Fourier Transform outputting a first sub-set of transformed symbols, followed by construction of a second sub-set of transformed symbols from the first sub-set, from the technique disclosed in the French patent application FR 2 972 091 filed on 28 Feb. 2011 in the name of the Applicant.

Polyphase filtering 12 is then done on the transformed symbols to shape the carriers. In particular, this polyphase filtering step uses an expansion factor taking account of a compression factor $\tau$, the compression factor $\tau$ being a number between 0 and 1 capable of transmitting the multi-carrier signal at a Faster-Than-Nyquist rate.

The polyphase filtering step is used to shape the carriers.

In particular, if the data symbols have real values, the expansion factor is equal to the integer rounding of $$\left[\tau \cdot \frac{M}{2}\right]$$

(i.e. to the integer closest to $$\left[\tau \cdot \frac{M}{2}\right]),$$

where M is an integer equal to the size of the mathematical transform. If the data symbols have complex values, the expansion factor is equal to the integer rounding of $[\tau \cdot M]$ (i.e. the integer closest to $[\tau \cdot M]$), where M is an integer equal to the size of the mathematical transform.

The signal s obtained after the filtering operation is a multi-carrier signal.

In particular, a pre-processing step 10 can be carried out before the data symbols transformation step. Such an optional step applies a phase shift to data symbols, and multiplies data symbols by a term taking account of the compression factor r. It is used particularly when the length of the prototype filter is even.

Figure 2:
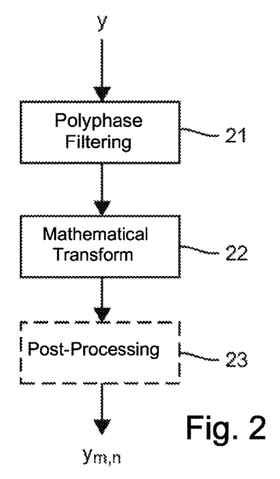
FIG. 2 shows the main steps used by the demodulation method according to a particular embodiment of the invention.

The main steps used by a demodulation method according to the invention will now be presented with reference to FIG. 2.

Such a method receives a multi-carrier signal $\gamma$ as input.

Polyphase filtering is then done on the multi-carrier signal $\gamma$ during a first step 21, outputting data symbols in the transformed domain. Such polyphase filtering uses a decimation factor taking account of the compression factor $\tau$.

In particular, if data symbols before modulation have real values (for example for an OFDM/OQAM modulation), the decimation factor is equal to the integer rounding of $$\left[\tau \cdot \frac{M}{2}\right].$$

If data symbols before modulation have complex values (for example for an OFDM modulation or oversampled OFDM modulation), the decimation factor is equal to the integer rounding of $[\tau \cdot M]$.

During a second step 22, a mathematical transform is applied on data symbols in the transformed domain, to transform them from the transformed domain to the frequency domain. This step uses a conventional transform, for example of the fast Fourier transform type.

If the length of the prototype filter used is even, post-processing will be carried out on the data symbols in the frequency domain during a third step 23, outputting estimated data symbols $\gamma_{m,n}$. In particular, this post-processing step multiplies data symbols in the frequency domain by a term taking account of the compression factor r. On the other hand, this step is optional if the length of the prototype filter is odd.

5.2 Example Embodiments

The following describes various example embodiments of the invention, for modulation and demodulation of data symbols with complex or real values for transmission at a Faster than Nyquist (FTN) rate.

One essential point is related to the definition of the FTN factor $N_f$, a parameter that will be found in all the disclosed implementation schemes.

5.2.1 Notation

The following describes the notation used in the remainder of the document:

$\tau$: FTN compression factor, $0 < \tau \leq 1$;
M: number of carriers, size of the mathematical transform, for example of the IFFT/FFT type;

$T_e$: sampling period;

$$F_0 = \frac{1}{MT_e};$$

inter-carrier spacing;

$T_0 = MT_e$;

L: the length of the prototype filter such that $L = b_1 M + b_2$, where $b_1$ and $b_2$ are integers such that $b_1 \geq 1$ and $0 \leq b_2 \leq M-1$;

D=L−1: delay parameter introduced to make the system causal;

$a_{m,n}, c_{m,n}$: data symbols to be transmitted, that can be real or complex.

5.2.2 First Example Embodiment

The following presents a first example embodiment according to which it is required to make an OFDM/OQAM modem for Faster-Than-Nyquist transmission.

In addition to the previous notation, we define:

$$N = \frac{M}{2}$$

the number of samples due to the offset of the OQAM;

$$\tau_0 = \frac{M}{2} T_e$$

a FTN factor $N_f$, such that $N_f$ is equal to the integer rounding of $$\tau \frac{M}{2};$$

a phase term $\phi_{m,n}$, for example such as $$\phi_{m,n} = \frac{\pi}{2}(m+n) + \epsilon \pi nm,$$

where $\epsilon \in \{-1, 0, 1\}$, or $$\phi_{m,n} = \frac{\pi}{2} n,$$

or any other phase.

It should be noted that if $$\phi_{m,n} = \frac{\pi}{2} n,$$

the phase term does not depend on m, and it is impossible to approach an orthogonal system when the compression factor $\tau$ tends to 1. If high compression factors are considered (tending towards 0), the choice of the phase term is not very important. It is sufficient that the receiver implements an equalization system that takes account of the selected phase law.

A) Modulation

FIGS. 3A to 3D show four OFDM/OQAM modulators for transmitting data at a Faster-Than-Nyquist rate.

Figure 3A:
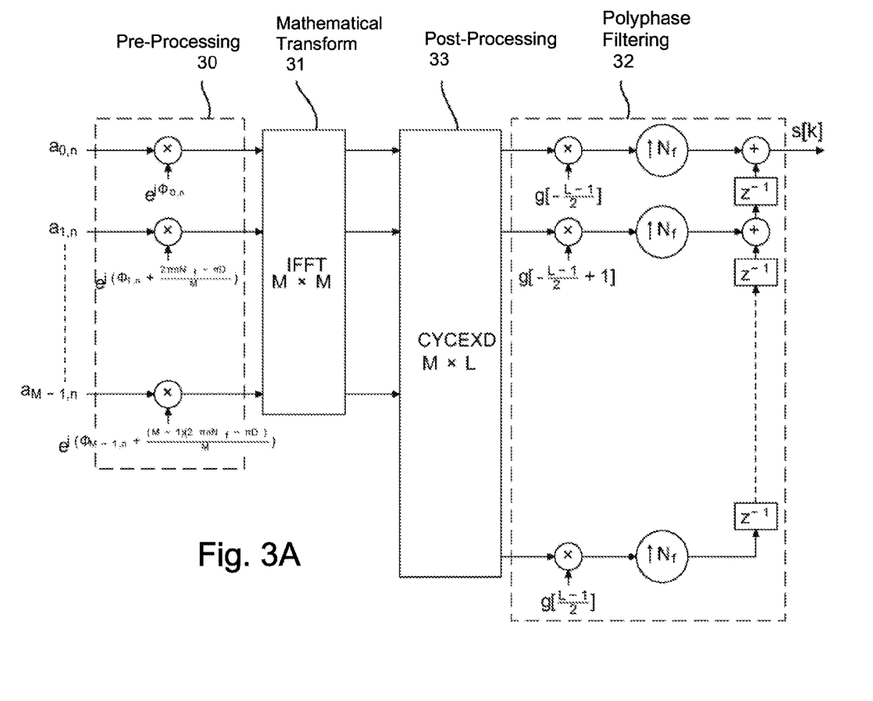
FIGS. 3A to 3D show examples of OFDM/OQAM modulators capable of transmitting data at a Faster-Than-Nyquist rate.
Figure 3B:
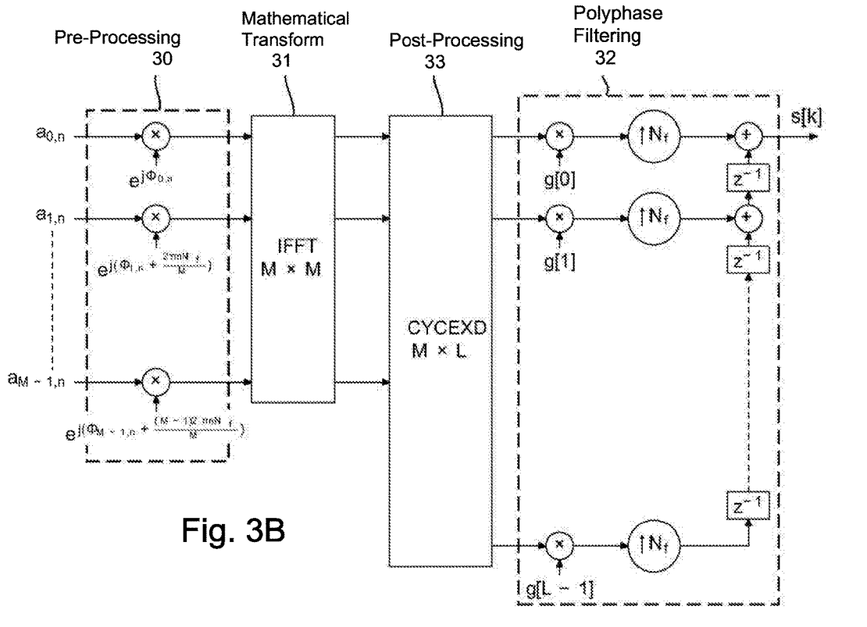

The first two modulators shown in FIGS. 3A and 3B use a pre-processing step, a mathematical transform step using a conventional inverse Fourier Transform module, and a polyphase filtering step.

Figure 3C:
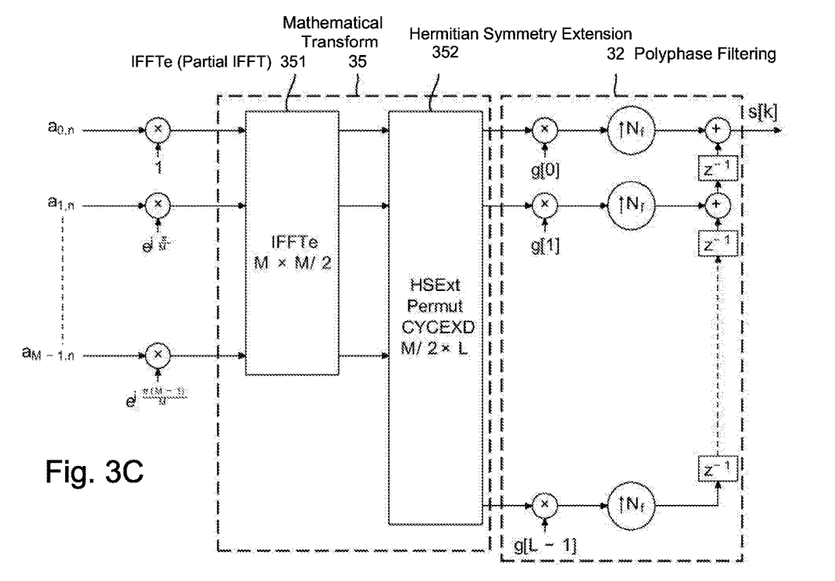
Figure 3D:
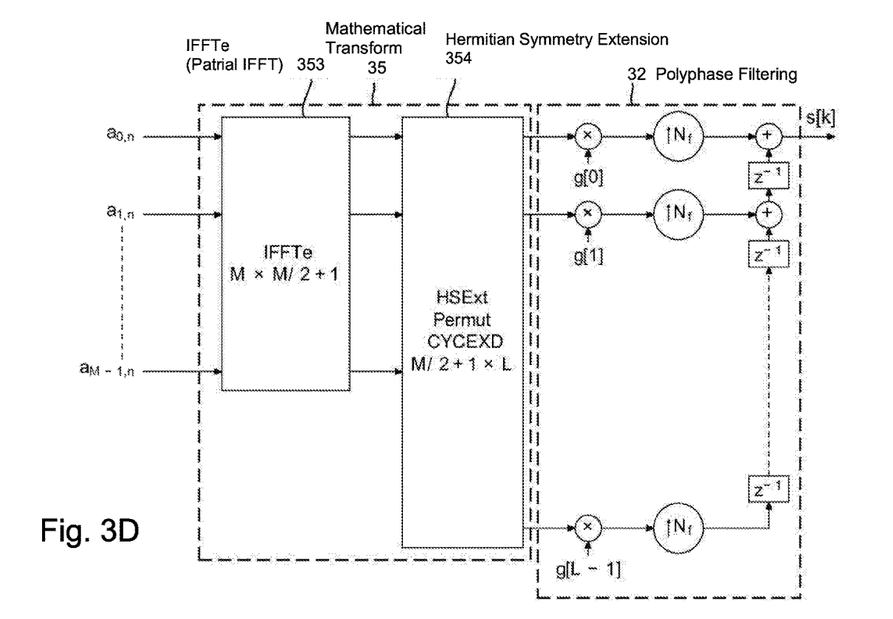

The last two modulators shown in FIGS. 3C and 3D use a mathematical transform step, adapting the technique disclosed in French patent application FR 2 972 091 mentioned above to take account of the FTN factor $N_f$, and a polyphase filtering step.

More precisely, the inventors proposed that the baseband equation of the OFDM/OQAM signal can be modified to obtain a modulator generating an FTN multi-carrier signal based on an OQAM modulation.

Remember that the "conventional" OFDM/OQAM continuous signal can be written in the baseband in the following form:

$$s(t) = \sum_{m=0}^{M-1} \sum_{n=-\infty}^{+\infty} a_{m,n} f_{m,n}(t)$$

where $f_{m,n}(t) = g(t - nT_0/2) e^{j2\pi m F_0 t} e^{j\phi_{m,n}}$, and g is the prototype filter.

The data symbols $a_{m,n}$ have a real value and they can be obtained from a $2^{2K}$-QAM complex constellation, taking the real part and then the imaginary part successively.

In sampling at rate $$T_e = \frac{T_0}{M},$$

and setting $s[k] = s((k-D/2)T_e)$, the OFDM/OQAM discrete signal can then be written in the baseband in the following form:

$$s[k] = \sum_{m=0}^{M-1} \sum_{n \in \mathbb{Z}} a_{m,n} g[k - nN] e^{j\frac{2\pi}{M} m \left(k - \frac{D}{2}\right)} e^{j\phi_{m,n}}$$

In the case of an orthogonal system (OFDM/OQAM), D is related to length L of the prototype filter by the relation D=L−1. In the orthogonal case, the same functions base is used on transmission and reception and the constraint is to satisfy the following real orthogonality condition:

$$\langle g_{m,n}, g_{m',n'} \rangle_R = \Re\{\langle g_{m,n}, g_{m',n'} \rangle\} = \Re\{\int_{-\infty}^{\infty} g_{m,n}(t) g^*_{m',n'}(t) dt\} = \delta_{m,n} \delta_{n,n'}$$

where $\langle .,. \rangle_R$ denotes the scalar real product.

In the case of the conventional OFDM/OQAM, transmission is made at exactly the Nyquist rate. In other words, the real data symbols $a_{m,n}$ are transmitted at a rate such that $$\frac{T_0}{2} F_0 = \frac{1}{2},$$

which corresponds to the condition $T_0 F_0 = 1$ for the complex data symbols from which they are derived.

According to the invention, the baseband equation of the OFDM/OQAM signal is modified as follows:

$$s(t) = \sum_{m=0}^{M-1} \sum_{n=-\infty}^{+\infty} a_{m,n} g(t - n\tau\tau_0) e^{j2\pi mF_0 t} e^{j\phi_{m,n}}$$

After sampling at rate $T_e$, a normalized expression relative to $T_e$, is obtained, i.e.:

$$s[k] = \sum_{m=0}^{M-1} \sum_{n=-\infty}^{+\infty} a_{m,n} g[k - nN_f] e^{j2\pi mk/M} e^{j\phi_{m,n}}$$

This expression can be reformulated as follows:

$$s[k] = \sum_{n=-\infty}^{+\infty} g[k - nN_f] \sum_{m=0}^{M-1} a_{m,n} e^{j\phi_{m,n}} e^{\frac{j2\pi mk}{M}}$$

It is required to implement the transform step in the form of an IFFT, to simplify the implementation of the modulator. The inventors have proposed to make modifications to the previous equation so that this IFFT can also simply generate the multi-carrier signal s[k].

Two cases can then be distinguished, the "non-causal" case that will correspond to a fairly usual theoretical scheme in which the prototype filter g is assumed to be at the time origin, and the "causal" case in which the prototype filter is implemented starting from time 0.

A.1) Non Causal Case

In the first case, the above equation is considered and it is assumed that the prototype filter g[k], where $$k \in \left[-\frac{L-1}{2}, \frac{L-1}{2}\right],$$

is not causal, in other words, it is centered on the origin k=0. An offset D/2 to the index of the Fourier transform is then introduced so that the causal index of the IFFT is also non-causal. Furthermore, we limit variations of the index of the Fourier Transform to the [0,L−1] interval. One method of performing this process is to replace the index k of the Fourier transform by k−$nN_f$+D/2. This gives the following formulated expression:

$$s[k] = \sum_{n=-\infty}^{+\infty} g[k - nN_f] \underbrace{\sum_{m=0}^{M-1} \underbrace{a_{m,n} e^{j\phi_{m,n}} e^{j2\pi m(nN_f - \frac{D}{2})/M}}_{\text{pre-processing}} e^{j2\pi m(k - nN_f + \frac{D}{2})/M}}_{\substack{\text{transformation (+post-processing)} \\ \text{filtering}}}$$

Such a modulator is shown in FIG. 3A. It comprises:
- a pre-processing module 30, implementing a multiplication of data symbols $a_{m,n}$ by a phase term $e^{j\phi_{m,n}}$ and a term taking account of the compression factor $$e^{j2\pi m(nN_f - \frac{D}{2})/M},$$

- a mathematical transform module 31, implementing an inverse fast Fourier transform, outputting M transformed symbols,
- a post-processing module 33, implementing a cyclic repetition of transformed symbols, outputting L transformed symbols, and
- a polyphase filtering module 32, implementing, for the i-th transformed symbol multiplication of the prototype filter g by the factor $$\left[i - \frac{L-1}{2}\right],$$

denoted $$g\left[i - \frac{L-1}{2}\right],$$

an expansion by the FTN factor $N_f$, and an offset of (i+1)$z^{-1}$, for i varying from 0 to L−1.

It should be noted that the pre-processing module 30 is optional if L is odd. Furthermore, the post-processing module 33 is also optional if L=M.

This post-processing module 33 is used to adapt the number of transformed symbols at the output from the transform module 31 to the size of the prototype filter.

More precisely, since the length L of the prototype filter is such that L=$b_1$M+$b_2$, where $b_1$ and $b_2$ are integers such that $b_1 \geq 1$ and $0 \leq b_2 \leq M-1$, the post-processing module 33 implements a block repetition of the M transformed symbols, outputting $b_1$ blocks of M transformed symbols and a sub-block of $b_2$ transformed symbols.

The post-processing module 33, also called a cyclic extension block CYCEXD, can be written mathematically using an L×M matrix in the following form:

$$CYCEXD_{L \times M} = \begin{bmatrix} I_{M \times M} \\ \ldots \\ I_{M \times M} \end{bmatrix}_{L \times M}$$

where I is the identity matrix.

For example, we can choose $b_1$=4 and $b_2$=0 if it is required to use a conventional Iota type prototype filter. We can choose $b_1$=1 and $b_2$=0 if it is required to use a conventional TFL type prototype filter.

Thus, due to the periodicity property of the Fourier transform, a filtering operation can be performed with a cyclic extension per block, followed by multiplication operation with a single factor, then followed by a parallel-to-series conversion.

The polyphase filtering module 32 is conventional, and its operation is not described in more detail.

A.2) Causal Case

In the second case, the reformulated equation of the multi-carrier signal s[k] is modified slightly as follows:

$$s[k] = \sum_{n=0}^{+\infty} g[k - nN_f] \sum_{m=0}^{M-1} a_{m,n} e^{j\phi_{m,n}} e^{j2\pi mk/M}$$

in which it is assumed that the prototype filter g[k], where $k \in [0, L-1]$, is causal, in other words it starts at index k=0.

Thus, it is no longer necessary to introduce an offset D/2 to the index of the Fourier transform, and the signal s[k] can be expressed as follows:

$$s[k] = \sum_{n=0}^{+\infty} g[k-nN_f] \underbrace{\underbrace{\sum_{m=0}^{M-1} \underbrace{a_{m,n} e^{j\phi_{m,n}} e^{j2\pi m(nN_f - D/2)/M}}_{pre-processing} e^{j2\pi m(k-nN_f)/M}}_{transformation(+post-processing)}}_{filtering}$$

Such a modulator is shown in FIG. 3B. It comprises:
- a pre-processing module 30, implementing multiplication of data symbols $a_{m,n}$ by a phase term $e^{j\Phi_{m,n}}$ and a term taking account of the compression factor $$e^{j2\pi m(nN_f - \frac{D}{2})/M},$$

- a mathematical transform module 31, implementing an inverse fast Fourier transform, outputting M transformed symbols,
- a post-processing module 33, implementing a cyclic repetition of transformed symbols, outputting L transformed symbols, and
- a polyphase filtering module 32, implementing for the i-th transformed symbol multiplication by the i-th coefficient of the prototype filter g denoted g[i], an expansion by the FTN factor $N_f$, and an offset of $(i+1)z^{-1}$, for i varying from 0 to L−1.

Once again, it should be noted that the pre-processing module 30 is optional if L is odd, and the post-processing module 33 is optional if L=M. Non-causal modulator structure (FIG. 3A) and causal modulator structure (FIG. 3B) are similar, all that is modified in the filtering module 32 are the indexes of the prototype filter g. Therefore, operation of the various modules is not discussed again in detail.

It should be noted that the two modulators shown in FIGS. 3A and 3B can process complex data symbols $c_{m,n}$, rather than real data symbols $a_{m,n}$. Thus, a new structure of OFDM/OQAM modulators is disclosed that can operate with complex values either at twice the Nyquist rate if the compression factor τ is equal to 1, or faster than twice the Nyquist rate if the compression factor τ is less than 1.

Other example embodiments of the modulator will now be disclosed with reference to FIGS. 3C and 3D, using mathematical transform step by adapting the technique described in the French patent application FR 2 972 091 mentioned above, and polyphase filtering step.

The example shown lies in the context of a causal filter and real data symbols. However, the solution described below can be applied in the context of a non-causal filter.

More precisely, the above equation for the multi-carrier signal is reconsidered:

$$s[k] = \sum_{n=0}^{+\infty} g[k-nN_f] \sum_{m=0}^{M-1} a_{m,n} e^{j\phi_{m,n}} e^{j2\pi m(nN_f - D/2)M} e^{j2\pi m(k-nN_f)/M}$$

Using a property of symmetry at the output from the IFFT, the OQAM multicarrier modulation at the FTN rate can be made from a partial IFFT, also called a clipped IFFT and denoted IFFTe, and therefore does not require a complete IFFT. This new scheme reduces the operational complexity by a factor of the order of 2.

Two cases are considered below depending on the value of the phase term $\phi_{m,n}$.

In a first case, we assume $$\phi_{m,n} = \frac{\pi n}{2}.$$

Considering the above equation for the multi-carrier signal, and assuming $D=L-1=b_1M+b_2-1$, we can write s[k] as follows:

$$s[k] = \sum_{n=0}^{+\infty} g[k-nN_f] \sum_{m=0}^{M-1} a_{m,n} e^{j\frac{\pi n}{2}} e^{j2\pi m(nN_f - D/2)M} e^{j2\pi mk_1/M}$$

$$s[k] = \sum_{n=0}^{+\infty} g[k-nN_f] e^{j\frac{\pi n}{2}} \sum_{m=0}^{M-1} a_{m,n} e^{-j\pi m(b_2-1)/M} e^{j2\pi mk_2/M}$$

where $k_1 = k - nN_f \in [0, L-1]$ and $k_2 = k_1 + nN_f - b_1 N$.

If $b_2 - 1$ is odd, in other words $b_2 - 1 = 2q - 1$ where $q \in \mathbb{N}$, the previous equation can be reformulated as follows:

$$s[k] = \sum_{n=0}^{+\infty} g[k-nN_f] e^{j\frac{\pi n}{2}} \underbrace{\underbrace{\sum_{m=0}^{M-1} a_{m,n} e^{j\pi m/M} e^{j2\pi mk_2/M}}_{IFFTe+HSExt}}_{\underbrace{permut+CYCEXD}_{filtering}}$$

where the indexes are such that $k_1 = k - nN_f \in [0, L-1]$ and $k_2 = k_1 + nN_f - b_1 N - q$.

A modulator capable of generating such a signal s[k] is shown in FIG. 3C. It comprises:
- a mathematical transform module 35, implementing a partial inverse fast Fourier transform, outputting C transformed symbols, reconstruction of (M−C) transformed symbols, outputting all transformed symbols, and if M≠L, permutation and repetition of the transformed symbols, outputting L transformed symbols,
- a polyphase filtering module 32, implementing for the i-th transformed symbol multiplication by the i-th coefficient of the prototype filter g denoted g[i], an expansion by the FTN factor $N_f$, and an offset of $(i+1)z^{-1}$, for i varying from 0 to L−1.

The following describes the principle of the mathematical transform module 35.

We start by applying a partial inverse fast Fourier transform in an IFFTe module 351, to M data symbols multiplied by the term $e^{j\pi m/M}$, for m varying from 0 to M−1. The result obtained is M/2 transformed symbols. It should be noted that the IFFTe module can use different known IFFT algorithms.

The vector obtained at the output from this module 351 is denoted $U_n$ such that:

$$U_n[k_1] = \sum_{m=0}^{M-1} a_{m,n} e^{j\pi m/M} e^{j2\pi mk_1/M}$$

-continued $$\text{for } k_1 = 0, \ldots, \frac{M}{2} - 1.$$

We then reconstruct the set of M transformed symbols in an HSExt-Permut-CYCEXD module 352, by applying a hermitian symmetry:

$$U_n[M - 1 - k_1] = U_n^*[k_1]$$

$$\text{for } k_1 = 0, \ldots, \frac{M}{2} - 1.$$

If M≠L, a permutation and a repetition of the transformed symbols is applied, outputting L transformed symbols such that:

$$U_n[k_2] = U_n[\mod(k_1 + nN_f - b_1N - q), M]$$

for $k_1 = 0, \ldots, M-1$,
or also:
$U_n[k_2] = U_n[\mod(k_2, M)]$ for $k_2 = 0, \ldots, L-1$ and n even,
$U_n[k_2] = -U_n^*[\mod(k_2, M)]$ for $k_2 = 0, \ldots, L-1$ and n odd.
Thus, L transformed symbols are obtained and input in the polyphase filtering module 32.

Operation of the polyphase filtering module 32 is conventional, and is not described in more detail.

If $b_2-1$ is even, in other words $b_2-1=2q$ where $q \in \mathbb{N}$, then the previous equation for s[k] may be reformulated as follows:

$$s[k] = \sum_{n=0}^{+\infty} g[k - nN_f] e^{j\frac{\pi n}{2}} \underbrace{\sum_{m=0}^{M-1} a_{m,n} e^{j2\pi mk_2/M}}_{\substack{IFFTe+HSExt \\ permut+CYCEXD}}$$
$$\underbrace{\phantom{s[k] = \sum g[k - nN_f]}}_{filtering}$$

in which the indexes are such that $k_1 = k - nN_f \in [0, L-1]$ and $k_2 = k_1 + nN_f - b_1N - q$.

FIG. 3D shows a modulator used to generate such a signal s[k]. It comprises:
- a mathematical transform module 35, implementing a partial inverse fast Fourier transform, outputting C transformed symbols, reconstruction of (M-C) transformed symbols, outputting all transformed symbols, and if M≠L, permutation and repetition of the transformed symbols, outputting L transformed symbols,
- a polyphase filtering module 32, implementing for the i-th transformed symbol multiplication by the i-th coefficient of the prototype filter g, denoted g[i], expansion by the FTN factor $N_f$, and offset of $(i+1)z^{-1}$, for i varying from 0 to L-1.

The following describes the principle of the mathematical transform module 35 in this case.

Firstly, a partial inverse fast Fourier transform is applied in an IFFTe module 353, to the M data symbols. The result thus obtained is $$\frac{M}{2} + 1$$

transformed symbols. It should be noted again that the IFFTe module can make use of different known used IFFT algorithms.

The vector obtained at the output from this module 353 is denoted $U_n$, as follows:

$$U_n[k_1] = \sum_{m=0}^{M-1} a_{m,n} e^{j2\pi mk_1/M}$$

$$\text{for } k_1 = 0, \ldots, \frac{M}{2}.$$

The set of M transformed symbols is then reconstructed in an HSExt-Permut-CYCEXD module 354 by applying an hermitian symmetry:

$$U_n[M - k_1] = U_n^*[k_1]$$

$$\text{for } k_1 = 1, \ldots, \frac{M}{2} - 1.$$

If M≠L, a permutation and a repetition of transformed symbols are applied, outputting L transformed symbols, such that:

$$U_n[k_2] = U_n[\mod(k_1 + nN_f b_1N - q, M)]$$

for $k_1 = 0, \ldots, M-1$.

The result thus obtained is L transformed symbols input into the polyphase filtering module 32. Once again, operation of the polyphase filtering module 32 is conventional and will not be described in more detail.

We will now consider a second case, in which the phase term is equal to $$\phi_{m,n} = \frac{\pi(n+m)}{2}.$$

In this case, in which orthogonality with a low compression factor can be restored, the multi-carrier signal s[k] uses the same expressions as those defined above for cases with odd and even $b_2-1$, with a difference in the indexes:

if $b_2 - 1$ is odd:

$$s[k] = \sum_{n=0}^{+\infty} g[k - nN_f] e^{j\frac{\pi n}{2}} \underbrace{\sum_{m=0}^{M-1} a_{m,n} e^{j\pi m/M} e^{j2\pi mk_2/M}}_{\substack{IFFTe+HSExt \\ permut+CYCEXD}}$$
$$\underbrace{\phantom{s[k] = \sum}}_{filtering}$$

if $b_2 - 1$ is even:

$$s[k] = \sum_{n=0}^{+\infty} g[k - nN_f] e^{j\frac{\pi n}{2}} \underbrace{\sum_{m=0}^{M-1} a_{m,n} e^{j2\pi mk_2/M}}_{\substack{IFFTe+HSExt \\ permut+CYCEXD}}$$
$$\underbrace{\phantom{s[k] = \sum}}_{filtering}$$

in which the indexes are such that $k_1 = k - nN_f \in [0, L-1]$ and $$k_2 = k_1 + \frac{M}{4} + nN_f - b_1N - q.$$

Partial inverse fast Fourier transform operations and reconstruction operations of all transformed symbols are similar to the previous case and will not be described in more detail.

On the other hand, permutation and repetition of transformed symbols outputting L transformed symbols, uses the following function:

$$U_n[k_2] = U_n\left[\mod\left(k_1 + \frac{M}{4} + nN_f - b_1N - q, M\right)\right]$$

for $k_1 = 0, \ldots, M-1$.

The rest of the processing is identical and will not be described further.

B) Demodulation

An OFDM/OQAM demodulator for receiving data at a Faster-Than-Nyquist rate is disclosed below with reference to FIG. 4.

Such a demodulator uses processing inverse to that done by the modulator.

In particular, assuming that data symbols $a_{m,n}$ are reals, the general expression for the demodulator is given by:

$$y_{m_0,n_0} = \Re\left\{\sum_k s[k]g_{m_0,n_0}[k]\right\}$$

in which the index $(m_0, n_0)$ corresponds to the targeted demodulation position in the time-frequency plane. The variation interval of the index k depends on the fact that the system is assumed to be causal or non-causal. In the following, we will derive the demodulator structure for the causal case. The non-causal case is easily deduced from the causal case.

By defining $g_{m_0,n_0}[k]$ in the above equation, we obtain:

$$y_{m_0,n_0} = \Re\left\{\sum_k s[k]g[k-n_0N_f]e^{-j\phi_{m_0,n_0}}e^{-\frac{j2\pi m_0(k-D/2)}{M}}\right\}$$

All that remains is to determine the variation interval of k in the summation part. Assuming that the prototype filter g[k] is a causal filter with length L, the sum is limited to $k \in [n_0N_f, n_0N_f+L-1]$. In the same way as for the modulator, the variation of the index of the Fourier transform has to be limited to $[0, M-1]$ so that a conventional FFT can be applied with its periodicity rule.

Consequently, the inventors proposed the following modifications:

$$y_{m_0,n_0} = \Re\left\{\underbrace{\underbrace{\sum_{k=n_0N_f}^{n_0N_f+M-1}\sum_{l=0}^{L/M}s[k+lM]g[k+lM-n_0N_f]e^{-\frac{j2\pi m_0(k-n_0N_f)}{M}}}_{filtering+CYCCOMB}}_{FFT}\right.$$

$$\left.\underbrace{e^{-j\phi_{m_0,n_0}}e^{-j2\pi m_0(n_0N_f-D/2)/M}}_{post-processing}\right\}$$

Figure 4:
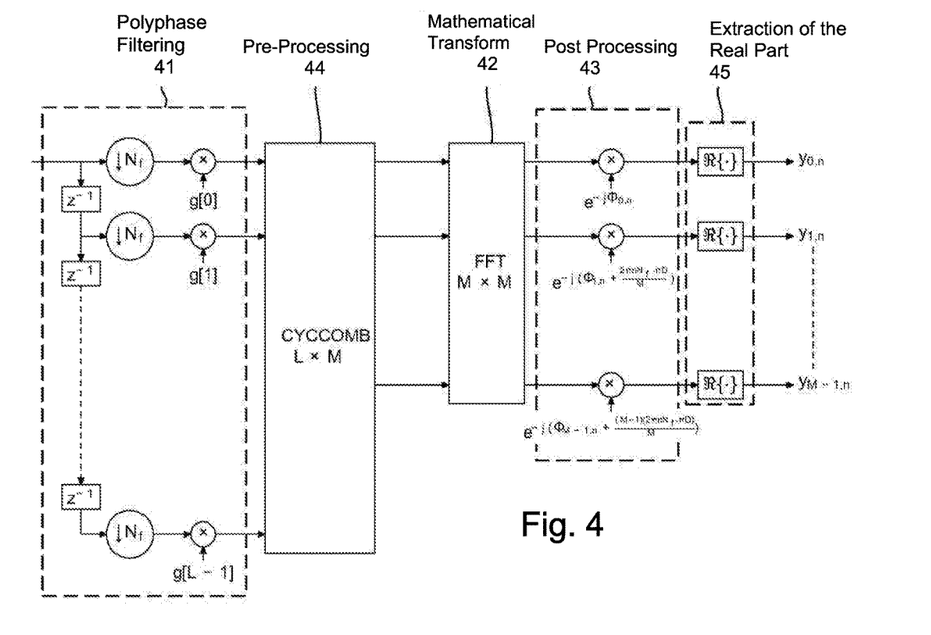
FIG. 4 shows an example of an OFDM/OQAM demodulator capable of receiving data at a Faster-Than-Nyquist rate.

Such a demodulator is shown in FIG. 4, and comprises:
- a polyphase filtering module 41, implementing an offset of $(i+1)z^{-1}$, decimation by the FTN factor $N_f$, multiplication by the coefficient [i] of the prototype filter g denoted g[i], for i varying from 0 to L−1, outputting L data symbols in the transformed domain;
- a pre-processing module 44, implementing extraction of M data symbols in the transformed domain (for example time domain);
- a mathematical transform module 42 implementing a fast Fourier transform, outputting M data symbols in the frequency domain,
- un post-processing module 43 implementing multiplication of data symbols in the frequency domain by a phase term $e^{-j\phi_{m,n}}$ and a term taking account of the compression factor $$e^{-j2\pi m(nN_f - \frac{D}{2})/M},$$

and
- an extraction module of the real part 45.

It should be noted that the pre-processing module 44 is optional if L=M.

Similarly, the post-processing module 43 is optional if L is odd.

Finally, if the modulated data symbols are complex and not real, the module for extraction of the real part 45 is also optional.

The pre-processing module 44 is used to adapt the number of data symbols in the transformed domain at the output from the filtering module 41 to the size of the mathematical transform module.

More precisely, the pre-processing module 44, also called the cyclic combination block CYCCOMB, implements extraction of a block of M data symbols in the transformed domain.

The pre-processing module 44 can be mathematically described by a M×L matrix that is the transpose of the CYCEXD matrix:

$$CYCCOMB_{M\times L} = CYCEXD_{L\times m}{}^T$$

Operation of the other modules is conventional. Therefore, they are not described in more detail.

Such a demodulator is particularly adapted to demodulating a multi-carrier signal constructed from the modulator according to any one of FIGS. 3A to 3D.

5.2.3 Second Example Embodiment

The following discloses a second example embodiment in which an attempt is made to make an OFDM modem for Faster-Than-Nyquist transmission.

In this context, data symbols, denoted $c_{m,n}$, can be complex.

An FTN factor $N_f$ is defined in addition to the previous notation, such that $N_f$ is equal to the integer rounding of τM.

A) Modulation

Figure 5:
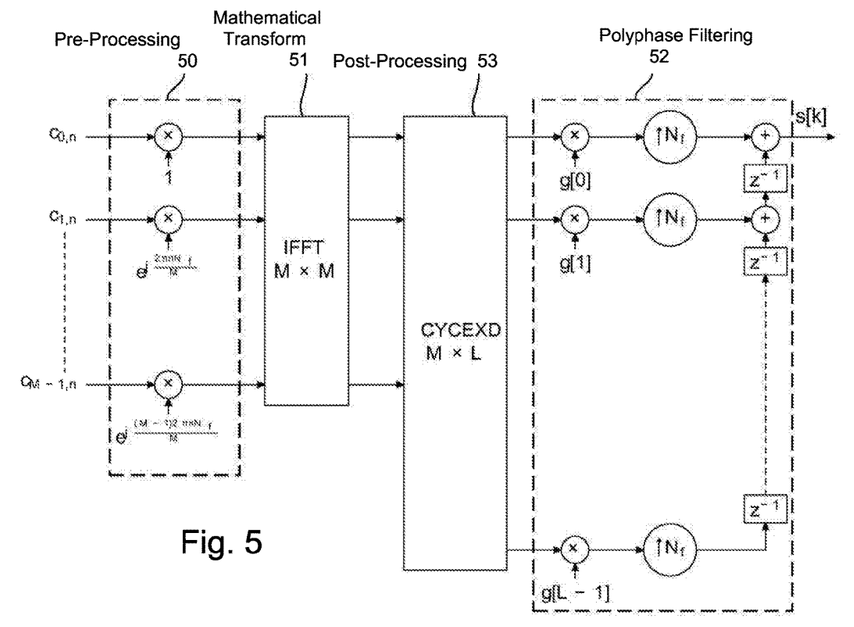
FIG. 5 shows an example of an OFDM modulator capable of transmitting data at a Faster-Than-Nyquist rate.

We will present an OFDM modulator for Faster-Than-Nyquist transmission of data, with reference to FIG. 5.

More precisely, the inventors proposed to modify the baseband equation of the OFDM signal, to obtain a modulator generating an FTN multi-carrier signal based on an OFDM modulation (i.e. with a complex orthogonality if τ=1).

It will be remembered that for an OFDM modulation on M carriers, it is required to transmit complex data symbols $c_{m,n}$ (m ∈ I={0, . . . ,M−1} and n ∈ ℤ). The usual representations for these symbols correspond to alphabets used for amplitude modulations such as QAM and PSK (Phase Shift Keying).

The conventional OFDM signal is written as follows in baseband:

$$s(t) = \sum_{m=0}^{M-1} \sum_{n=-\infty}^{+\infty} c_{m,n} f_{m,n}(t)$$

where $f_{m,n}(t) = f(t-nT_0)e^{j2\pi mF_0 t} e^{j\theta_{m,n}}$ and f(t) is an integrable square function also called a prototype function;

$T_0$ is the duration of a multicarrier symbol;

$F_0$ is the space between two successive carriers;

$\theta_{m,n}$ is a phase term that can be chosen arbitrarily;

$j^2=-1$.

In this context, the orthogonality condition, in other words the condition that minimizes the error in the presence of AWGN type disturbance, is made considering the adapted filter in reception. In other words, the scalar product of basic functions used for both modulation and demodulation must be such that:

$$\langle f_{m,n}, f_{m',n'} \rangle = \int_{-\infty}^{\infty} f_{m,n}(t) f^*_{m',n'}(t) dt = \delta_{n,n'} \delta_{m,m'}$$

If it is required to transmit at the Nyquist rate in addition to an orthogonal system, it is necessary to impose $F_0T_0=1$. In other words, the Nyquist condition described above (WT=½) must be satisfied for each carrier m. The difference in the multiplication factor (½) is due to the fact that this case considers the transmission of complex and non-real data symbols.

According to the invention, the baseband equation of the OFDM signal is modified as follows in order to transmit data at a Faster-Than-Nyquist rate:

$$s(t) = \sum_{m=0}^{M-1} \sum_{n=-\infty}^{+\infty} c_{m,n} g(t - n\tau T_0) e^{j2\pi mF_0 t}$$

Sampling at rate $T_e$, the OFDM discrete signal normalized relative to the rate $T_e$ can be written in baseband in the following form:

$$s[k] = \sum_{m=0}^{M-1} \sum_{n=-\infty}^{+\infty} c_{m,n} g[k - nN_f] e^{j2\pi mk/M}$$

$$s[k] = \sum_{n=0}^{+\infty} g[k - nN_f] \underbrace{\sum_{m=0}^{M-1} \underbrace{c_{m,n} e^{j2\pi mnN_f/M}}_{pre\text{-}processing} e^{j2\pi m(k-nN_f)/M}}_{IFFT+CYCEXD}$$
$$\underbrace{\phantom{xxxxxxxxxxxxxxxxxxxxxxxxxxxxxxxxxxxxxxxxxxxxxxxx}}_{filtering}$$

In the following, we will derive the structure of the modulator in the causal case. The non-causal case is easily derived from the causal case.

Such a modulator is shown in FIG. 5. It comprises:
- a pre-processing module 50, implementing multiplication of data symbols $c_{m,n}$ by a term taking account of the compression factor $e^{j2\pi mnN_f/M}$,
- a mathematical transform module 51, implementing an inverse fast Fourier transform, outputting M transformed symbols,
- a post-processing module 53, implementing a cyclic repetition of transformed symbols, outputting L transformed symbols, and
- a polyphase filtering module 52, applying for the i-th transformed symbol, multiplication by the i-th coefficient of the prototype filter g denoted g[i], expansion by the FTN factor $N_f$ and an offset of $(i+1)z^{-1}$, for i varying from 0 to L−1.

As in the above examples, it can be seen that if L is odd, the pre-processing module 50 is optional. Furthermore, if L=M, the post-processing module 53 is optional.

Operation of the various modules has been described above with reference to FIGS. 3A to 3D. Therefore, it will not be repeated here.

B) Demodulation

An OFDM demodulator, capable of receiving data at a Faster-Than-Nyquist rate, is described in the following with reference to FIG. 6.

Such a demodulator uses processing inverse to that done by the modulator.

The general expression for the demodulator is given by:

$$y_{m_0,n_0} = \sum_k s[k] g_{m_0,n_0}[k]$$

where the index $(m_0, n_0)$ corresponds to the targeted demodulation position in the time-frequency plane. The variation interval of the index k depends on whether or not the system is assumed to be causal. We derive the structure of the demodulator in the causal case below. The non-causal case is easily derived from the causal case.

In defining $g_{m_0,n_0}[k]$ in the above equation, we obtain:

$$y_{m_0,n_0} = \underbrace{\sum_{k=n_0N_f}^{n_0N_f+M-1} \underbrace{\sum_{l=0}^{L/M} s[k+lM] g[k+lM-n_0N_f]}_{filtering+CYCOMB} e^{-j2\pi m_0(k-n_0N_f)/M}}_{FFT}$$

$$\underbrace{e^{-j2\pi m_0 n_0 N_f/M}}_{post\text{-}processing}$$

Figure 6:
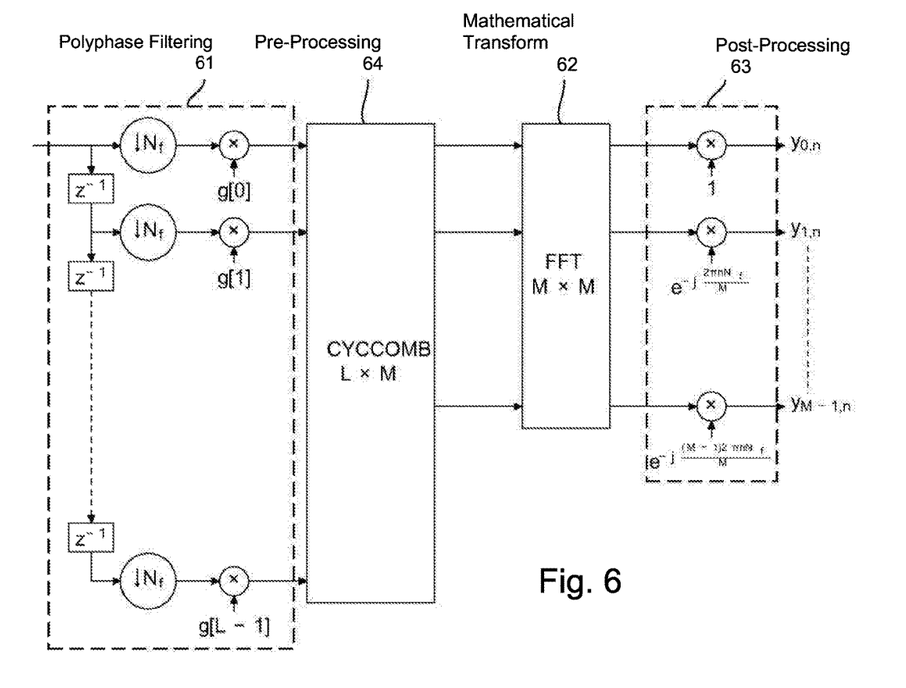
FIG. 6 shows an example of an OFDM demodulator capable of receiving data at a Faster-Than-Nyquist rate.

Such a demodulator is shown in FIG. 6. It comprises:
- a polyphase filtering module 61, applying an offset of $(i+1)z^{-1}$, decimation by the FTN factor $N_f$, multiplication of the prototype filter g by the coefficient [i], denoted g[i], for i varying from 0 to L−1, outputting L data symbols in the transformed domain;
- a pre-processing module 64, applying extraction of M data symbols in the transformed domain (for example the time domain);
- a mathematical transform module 62, applying a fast Fourier transform, outputting M data symbols in the frequency domain; and a post-processing module 63, applying multiplication of data symbols in the frequency domain by a term taking account of the compression factor $e^{-j2\pi mnN_f/M}$.

It should be noted that if L=M, the pre-processing module 64 is optional.

Similarly, if L is odd, the post-processing module 63 is optional.

Operation of all modules is similar to that described with reference to FIG. 4. Therefore, they will not be described in more detail.

In particular, such a demodulator is suitable for demodulating a multi-carrier signal constructed using the modulator in FIG. 5.

5.3 Structure of the Modulator or Demodulator

Finally, the simplified structure of a modulator modulating a multi-carrier signal and the structure of a demodulator demodulating a multi-carrier signal according to one particular embodiment of the invention, are described with reference to FIGS. 7 and 8 respectively.

Figure 7:
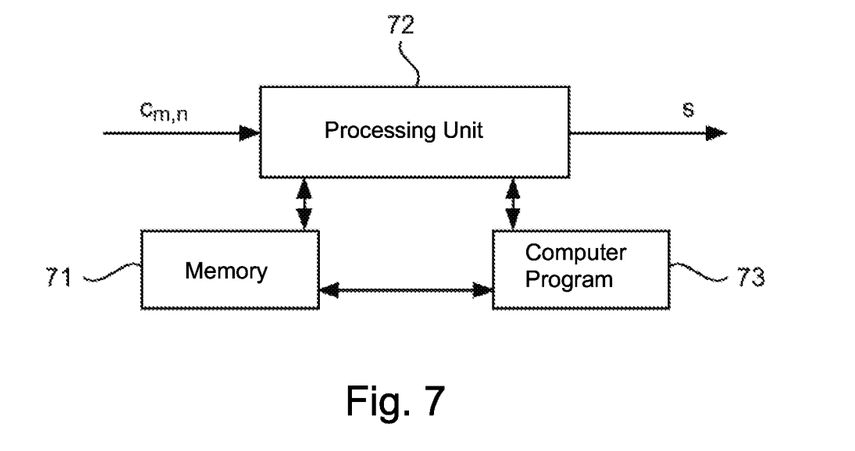
FIGS. 7 and 8 show the simplified structure of a modulator implementing a modulation technique and a demodulator implementing a demodulation technique according to a particular embodiment of the invention, respectively.

As shown in FIG. 7, such a modulator comprises a memory 71 comprising a buffer memory, a processing unit 72 for example including a microprocessor μP and controlled by the computer program 73, implementing the modulation method according to one embodiment of the invention.

On initialization, the code instructions of the computer program 73 may for example be loaded into a RAM memory before being run by the processor in the processing unit 72. The processing unit 72 receives the real data symbols $a_{m,n}$ or complex data symbols $c_{m,n}$, as inputs. The microprocessor in the processing unit 72 implements the steps of the modulation method described above, in accordance with the instructions of the computer program 73, to generate a multi-carrier signal. To achieve this, in addition to the buffer memory 71, the modulator includes a mathematical transform module for transforming data symbols from the frequency domain to a transformed domain, and a polyphase filtering module for filtering transformed symbols, applying an expansion factor taking account of a compression factor τ.

These modules are controlled by the microprocessor in the processing unit 72.

Figure 8:
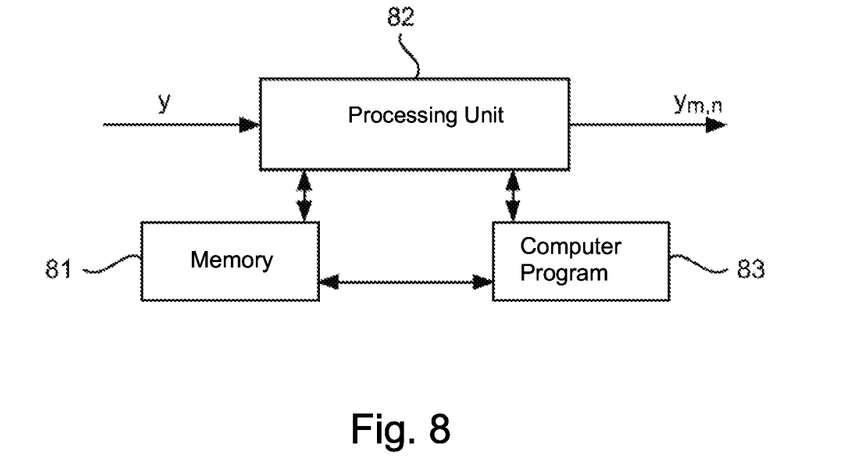

As shown in FIG. 8, such a demodulator has a memory 81 comprising a buffer memory, a processing unit 82 implements, for example comprising a microprocessor μP and controlled by the computer program 82, implementing the demodulation method according to one embodiment of the invention.

On initialization, the code instructions of the computer program 83 may for example be loaded in a RAM memory before being run by the processor in the processing unit 82. The processing unit 82 receives a multi-carrier signal as input. The microprocessor in the processing unit 82 implements the steps of the demodulation method described above, according to the instructions of the computer program 83, to estimate transmitted data symbols. To achieve this, in addition to the buffer memory 81, the demodulation device comprises a polyphase filtering module for filtering the multi-carrier signal, outputting data symbols in the transformed domain, a mathematical transform module for transforming data symbols in the transformed domain, from a transformed domain to the frequency domain, outputting data symbols in the frequency domain and a module for post-processing of data symbols in the frequency domain, outputting estimated data symbols. The post-processing module implements multiplication of data symbols in the frequency domain by a term taking account of a compression factor τ, and the polyphase filtering module uses a decimation factor taking account of the compression factor τ.

These modules are controlled by the microprocessor of the processing unit 82.

Although the present disclosure has been described with reference to one or more examples, workers skilled in the art will recognize that changes may be made in form and detail without departing from the scope of the disclosure and/or the appended claims.

The invention claimed is:

1. A method comprising:
   modulating data symbols with a modulator device, outputting a multi-carrier signal, implementing:
   a mathematical transform step, which transforms the data symbols from a frequency domain to a time domain, outputting transformed symbols,
   a polyphase filtering step, which filters said transformed symbols, outputting said multi-carrier signal, wherein the polyphase filtering step applies an expansion to a prototype filter by an expansion factor that is a function of a compression factor τ, said compression factor τ being a number between 0 and 1 and strictly less than 1, and wherein said expansion factor is equal to the integer rounding of $$\left[\tau \cdot \frac{M}{2}\right]$$

if said data symbols are real values, and said expansion factor is equal to the integer rounding of [τ.M] if said data symbols are complex values, where M is an integer equal to the number of carriers or to a size of said mathematical transform; and
   transmitting the multi-carrier signal at a faster-than-Nyquist rate.

2. The method according to claim 1, wherein modulating comprises a pre-processing step of said data symbols, implemented before said mathematical transform step, and said pre-processing step implements multiplication of said data symbols by a term taking account of said compression factor τ.

3. The method according to claim 1, wherein modulating comprises a step of post-processing said transformed symbols, implemented before said polyphase filtering step, said mathematical transform step outputting M transformed symbols, where M is an integer equal to the number of carriers, and said post-processing step implements repetition by block of said M transformed symbols, outputting $b_1$ blocks of M transformed symbols, where $b_1$ is an integer such that $b_1 > 0$, and a sub-block of $b_2$ transformed symbols, where $b_2$ is an integer such that $0 < b_2 < M$, and wherein said polyphase filtering step uses the prototype filter with a size $L = b_1 M + b_2$ that uses $b_1$ blocks of M transformed symbols and said sub-block of $b_2$ transformed symbols as inputs.

4. The method according to claim 3, wherein $b_1$ is equal to 4 and $b_2$ is equal to 0.

5. The method according to claim 1, wherein, for an OFDM/OQAM type modulation and for data symbols with real values, said mathematical transform step implements a transformation from the frequency domain to the time domain comprising the following sub-steps:
   application of a partial inverse Fourier transform to said data symbols, outputting a first sub-set of C transformed symbols;

from the first sub-set, obtain a second sub-set of (M-C) transformed symbols, said second sub-set of transformed symbols being complementary to said first sub-set of transformed symbols, to form the set of M transformed symbols;

repetition and permutation of said M transformed symbols, outputting L transformed symbols, where L, M and C are integers such that L >M >C.

6. A modulator device for modulating data symbols, outputting a multi-carrier signal, comprising:
a mathematical transform module configured to transform data symbols, from a frequency domain to a time domain, outputting transformed symbols;
a polyphase filtering module configured to filter said transformed symbols, outputting said multi-carrier signal, wherein said polyphase filtering module applies an expansion to a prototype filter by an expansion factor that is a function of a compression factor τ, said compression factor τ being a number between 0 and 1 and strictly less than 1, and wherein said expansion factor is equal to the integer rounding of $$\left[\tau \cdot \frac{M}{2}\right]$$

if said data symbols are real values, and said expansion factor is equal to the integer rounding of [τ. M] if said data symbols are complex values, where M is an integer equal to the number of carriers or to a size of said mathematical transform; and
an output through which the multi-carrier signal is transmitted.

7. A method comprising:
receiving a multi-carrier signal by a demodulator device; and
demodulating the multi-carrier signal with the demodulator device, outputting estimated data symbols, implementing:
a polyphase filtering step, which filters said multi-carrier signal, outputting data symbols in the time domain, and
a mathematical transform step, which transforms said data symbols in the time domain, from a time domain to the frequency domain, outputting data symbols in the frequency domain, wherein said polyphase filtering step applies a decimation to a prototype filter by a decimation factor that is a function of a compression factor τ, said compression factor τ being a number between 0 and 1 and strictly less than 1, and wherein said decimation factor is equal to the integer rounding of $$\left[\tau \cdot \frac{M}{2}\right]$$

if said data symbols before modulation are real values, and said decimation factor is equal to the integer rounding of [τ. M] if said data symbols before modulation are complex values, where M is an integer equal to the number of carriers or to a size of said mathematical transform.

8. The method according to claim 7, wherein demodulating comprises a post-processing step of data symbols in the frequency domain, outputting said estimated data symbols, said post-processing step implementing multiplication of said data symbols in the frequency domain by a term taking account of said compression factor τ.

9. A demodulating device for demodulating a multi-carrier signal, outputting estimated data symbols, comprising:
an input, which receives the multi-carrier signal;
a polyphase filtering module configured to filter said multi-carrier signal, outputting data symbols in the time domain,
a mathematical transform module configured to transform said data symbols from a time domain to a frequency domain, outputting data symbols in the frequency domain, wherein said polyphase filtering module applies a decimation to a prototype filter by a decimation factor that is a function of a compression factor τ, said compression factor τ being a number between 0 and 1 and strictly less than 1, and wherein said decimation factor is equal to the integer rounding of $$\left[\tau \cdot \frac{M}{2}\right]$$

if said data symbols before modulation are real values, and said decimation factor is equal to the integer rounding of [τ.M] if said data symbols before modulation are complex values, where M is an integer equal to the number of carriers or to a size of said mathematical transform.

10. A non-transitory computer-readable storage medium comprising a computer program stored thereon, which includes instructions for performing a method when this program is run using a processor of a modulator device, wherein the method comprises:
modulating data symbols with a modulator device, outputting a multi-carrier signal, implementing:
a mathematical transform step, which transforms the data symbols from a frequency domain to a time domain, outputting transformed symbols,
a polyphase filtering step, which filters said transformed symbols, outputting said multi-carrier signal, wherein the polyphase filtering step applies an expansion to a prototype filter by an expansion factor that is a function of a compression factor τ, said compression factor τ being a number between 0 and 1 and strictly less than 1, and wherein said expansion factor is equal to the integer rounding of $$\left[\tau \cdot \frac{M}{2}\right]$$

if said data symbols are real values, and said expansion factor is equal to the integer rounding of [τ.M] if said data symbols are complex values, where M is an integer equal to the number of carriers or to a size of said mathematical transform; and transmitting the multi-carrier signal at a faster-than-Nyquist rate.

* * * * *